US011995049B2

(12) United States Patent
Liu et al.

(10) Patent No.: US 11,995,049 B2
(45) Date of Patent: May 28, 2024

(54) MULTI-SCHEMA VERSION SUPPORT IN DATA SYNCHRONIZATION

(71) Applicant: Huawei Technologies Co., Ltd., Guangdong (CN)

(72) Inventors: Ye Liu, Foster City, CA (US); Jianjun Chen, Cupertino, CA (US); Kamini Manoharlal Jagtiani, Los Altos, CA (US); Chunfeng Pei, San Jose, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/051,287

(22) Filed: Oct. 31, 2022

(65) Prior Publication Data

US 2023/0082267 A1    Mar. 16, 2023

Related U.S. Application Data

(63) Continuation of application No. PCT/US2020/070013, filed on Apr. 30, 2020.

(51) Int. Cl.
*G06F 16/21*    (2019.01)
*G06F 8/65*    (2018.01)
*H04L 67/00*    (2022.01)

(52) U.S. Cl.
CPC .............. *G06F 16/213* (2019.01); *G06F 8/65* (2013.01); *H04L 67/34* (2013.01)

(58) Field of Classification Search
CPC .................................................. G06F 16/213
See application file for complete search history.

(56) References Cited

U.S. PATENT DOCUMENTS

2009/0037430 A1* 2/2009 Mukkamala .......... G06F 16/252
                                                                        709/248
2014/0282477 A1* 9/2014 Modarresi ............. G06F 16/958
                                                                        717/171

(Continued)

FOREIGN PATENT DOCUMENTS

WO    WO-2021062427 A1    4/2021

OTHER PUBLICATIONS

"International Application Serial No. PCT/US2020/070013, International Search Report dated Dec. 8, 2020", 4 pgs.

(Continued)

*Primary Examiner* — Baoquoc N To
(74) *Attorney, Agent, or Firm* — Schwegman Lundberg & Woessner, P.A.

(57) ABSTRACT

A computer-implemented method for performing application data consistency management among a plurality of computing devices within a communication network includes retrieving by a first device, application data from a second device. The application data includes an app ID and a first application version number of an app residing on the second device. A first database table is updated using an object type associated with the app ID and the first application version number. The object type identifies a database table schema of a data object used by the app and a plurality of data fields of the data object. Data stored by one or more of the plurality of data fields is synchronized with a third device based on a second application version number of the app residing on the third device and the first database table.

18 Claims, 10 Drawing Sheets

(56) References Cited

U.S. PATENT DOCUMENTS

2015/0193225 A1 7/2015 Brunsman et al.
2017/0192773 A1* 7/2017 Trevathan ................. G06F 8/71

OTHER PUBLICATIONS

"International Application Serial No. PCT/US2020/070013, Written Opinion dated Dec. 8, 2020", 7 pgs.
"International Application Serial No. PCT/US2020/070013, International Preliminary Report on Patentability dated Nov. 10, 2022", 9 pgs.

* cited by examiner

MULTI-SCHEMA VERSION SUPPORT IN DATA SYNCHRONIZATION

CROSS-REFERENCE TO RELATED APPLICATIONS

This application is a continuation of International Application No. PCT/US2020/070013, filed on Apr. 30, 2020, entitled "MULTI-SCHEMA VERSION SUPPORT IN DATA SYNCHRONIZATION," the benefit of priority of which is claimed herein, and which application is hereby incorporated herein by reference in its entirety.

TECHNICAL FIELD

The present disclosure is related to schema version support in connection with data synchronization techniques in a communication network (such as a Mobile-Backend-as-a-Service, or MBaaS, architecture), including techniques for application data consistency management across multiple devices and techniques for multi-schema version support in data synchronization.

BACKGROUND

Computing devices (e.g., mobile computing devices) are generating more data and are consuming more power to process the increased amount of data. Additionally, with the increased number of portable and mobile devices, data gathered from such device may need to be accessed and synchronized at multiple network locations within a network architecture for different purposes, including analytics, artificial intelligence (AI) processing, business intelligence processing, or other analytic or data processing functions.

A network architecture may include an MBaaS architecture, which may be used as an integrated distributed data management system that can simplify user application ("app") development as well as data management both on-device and in a network. In some aspects, an MBaaS architecture may be used for providing web app and mobile app developers with a way to link their applications to backend data storage and APIs, including services provided by a hosting party. In this regard, the MBaaS architecture assists app developers with backend data service setup and maintenance.

Each app executing on computing devices within a network architecture (e.g., within the MBaaS architecture) may be updated multiple times during its lifecycle, to fix defects (or "bugs") or add new features. However, a user may own/use multiple computing devices, and the user may not update all computing devices to the same version of the app at the same time. In this regard, the user might continue to use an app at different versions on different devices, which may cause data changes and synchronization issues among the user's computing devices.

SUMMARY

Various examples are now described to introduce a selection of concepts in a simplified form that is further described below in the detailed description. The Summary is not intended to identify key or essential features of the claimed subject matter, nor is it intended to be used to limit the scope of the claimed subject matter.

According to a first aspect of the present disclosure, there is provided a computer-implemented method for performing application data consistency management among a plurality of computing devices within a communication network. The method includes retrieving, by a first computing device of the plurality of computing devices, application data from a second computing device of the plurality of computing devices. The application data includes an application identification (ID) and a first application version number of an application residing on (or executing on) the second computing device. A first database table is updated, by the first computing device, using an object type associated with the application ID and the first application version number. The object type identifies a database table schema of a data object used by the application and a plurality of data fields of the data object. In response to communicating, by the first computing device, a notification of updated data fields of the plurality of data fields of the data object to a third computing device of the plurality of computing devices, a second application version number is received from the third computing device. The second application version number is associated with the application residing on (or executing on) the third computing device. One or more data fields of the updated data fields are selected, by the first computing device, based on the second application version number. Data stored by the one or more data fields of the updated data fields is communicated, by the first computing device, to the third computing device for synchronization.

In a first implementation form of the method according to the first aspect as such, application code is executed, by the first computing device, to install the application with the first application version number at the first computing device, prior to the updating of the first database table.

In a second implementation form of the method according to the first aspect as such or any preceding implementation form of the first aspect, the first database table is an application version history table mapping the first application version number to the object type and to an object type version number.

In a third implementation form of the method according to the first aspect as such or any preceding implementation form of the first aspect, a second database table is updated, by the first computing device, based on the object type. The second database table maps the object type version number to the object type and to the plurality of data fields of the data object.

In a fourth implementation form of the method according to the first aspect as such or any preceding implementation form of the first aspect, an object type version number used by the application residing on the third computing device is determined, by the first computing device, using the first database table.

In a fifth implementation form of the method according to the first aspect as such or any preceding implementation form of the first aspect, the one or more data fields of the updated data fields are determined, by the first computing device, using the object type version number used by the application residing on the third computing device and using the second database table.

In a sixth implementation form of the method according to the first aspect as such or any preceding implementation form of the first aspect, the data stored by the one or more data fields of the updated data fields is communicated, by the first computing device, to the third computing device, in response to a data download request from the third computing device. The data download request includes the second application version number.

In a seventh implementation form of the method according to the first aspect as such or any preceding implementation form of the first aspect, the application data includes user information identifying a user authorized to use the application on the second computing device.

In an eighth implementation form of the method according to the first aspect as such or any preceding implementation form of the first aspect, a verification is performed by the first computing device on whether the user is authorized to use the application on the third computing device.

In a ninth implementation form of the method according to the first aspect as such or any preceding implementation form of the first aspect, the data stored by the one or more data fields of the updated data fields is communicated, by the first computing device, to the third computing device when the verification is successful. A notification is generated when the verification is unsuccessful.

According to a second aspect of the present disclosure, there is provided a system for performing application data consistency management among a plurality of computing devices within a communication network including a memory that stores instructions and one or more processors in communication with the memory. The one or more processors execute the instructions to retrieve application data from a second computing device of the plurality of computing devices, the application data including an application ID and a first application version number of an application residing on (or executing on) the second computing device. A first database table is updated using an object type associated with the application ID and the first application version number. The object type identifies a database table schema of a data object used by the application and a plurality of data fields of the data object. In response to a communication of a notification of updated data fields of the plurality of data fields of the data object to a third computing device of the plurality of computing devices, a second application version number is received from the third computing device. The second application version number is associated with the application residing on (or executing on) the third computing device. One or more data fields of the updated data fields are selected based on the second application version number. Data stored by the one or more data fields of the updated data fields is communicated to the third computing device for synchronization.

In a first implementation form of the system according to the second aspect as such, the first database table is an application version history table mapping the first application version number to the object type and to an object type version number.

In a second implementation form of the system according to the second aspect as such or any preceding implementation form of the second aspect, the one or more processors execute the instructions to update a second database table based on the object type. The second database table maps the object type version number to the object type and to the plurality of data fields of the data object.

In a third implementation form of the system according to the second aspect as such or any preceding implementation form of the second aspect, the one or more processors execute the instructions to determine an object type version number used by the application residing on the third computing device, the determining using the first database table.

In a fourth implementation form of the system according to the second aspect as such or any preceding implementation form of the second aspect, the one or more data fields of the updated data fields are determined using the object type version number used by the application residing on the third computing device and using the second database table.

In a fifth implementation form of the system according to the second aspect as such or any preceding implementation form of the second aspect, the data stored by the one or more data fields of the updated data fields is communicated to the third computing device, in response to a data download request from the third computing device. The data download request includes the second application version number.

According to a third aspect of the present disclosure, there is provided a non-transitory computer-readable medium storing instruction for performing application data consistency management among a plurality of computing devices within a communication network, that when executed by one or more processors of a first computing device of a plurality of computing devices, cause the one or more processors to perform operations. The operations include retrieving application data from a second computing device of the plurality of computing devices. The application data includes an application ID and a first application version number of an application residing on (or executing on) the second computing device. A first database table is updated using an object type associated with the application ID and the first application version number. The object type identifying a database table schema of a data object used by the application and a plurality of data fields of the data object. In response to a communication of a notification of updated data fields of the plurality of data fields of the data object to a third computing device of the plurality of computing devices, a second application version number is received from the third computing device. The second application version number is associated with the application residing on (or executing on) the third computing device. One or more data fields of the updated data fields are selected based on the second application version number. Data stored by the one or more data fields of the updated data fields is communicated to the third computing device for synchronization.

In a first implementation form of the non-transitory computer-readable medium according to the third aspect as such, the first database table is an application version history table mapping the first application version number to the object type and to an object type version number.

In a second implementation form of the non-transitory computer-readable medium according to the third aspect as such, upon execution, the instructions further cause the one or more processors to perform operations including updating a second database table based on the object type. The second database table maps the object type version number to the object type and to the plurality of data fields of the data object.

In a third implementation form of the non-transitory computer-readable medium according to the third aspect as such, upon execution, the instructions further cause the one or more processors to perform operations including determining an object type version number used by the application residing on the third computing device, the determining using the first database table.

In a fourth implementation form of the non-transitory computer-readable medium according to the third aspect as such, upon execution, the instructions further cause the one or more processors to perform operations including determining the one or more data fields of the updated data fields, the determining using the object type version number of the object type used by the application residing on the third computing device and using the second database table.

In a fifth implementation form of the non-transitory computer-readable medium according to the third aspect as such, upon execution, the instructions further cause the one or more processors to perform operations including communicating to the third computing device, the data stored by the one or more data fields of the updated data fields, the communicating being in response to a data download request from the third computing device. The data download request includes the second application version number.

In a sixth implementation form of the non-transitory computer-readable medium according to the third aspect as such, the application data includes user information identifying a user authorized to use the application on the second computing device.

In a seventh implementation form of the non-transitory computer-readable medium according to the third aspect as such, upon execution, the instructions further cause the one or more processors to perform operations including performing a verification whether the user is authorized to use the application on the third computing device.

In an eighth implementation form of the non-transitory computer-readable medium according to the third aspect as such, upon execution, the instructions further cause the one or more processors to perform operations including communicating to the third computing device, the data stored by the one or more data fields of the updated data fields, the communication being when the verification is successful. A notification is generated when the verification is unsuccessful.

According to a fourth aspect of the present disclosure, there is provided a system for performing application data consistency management among a plurality of computing devices within a communication network. The system includes means for retrieving application data from a second computing device of the plurality of computing devices. The application data includes an application ID and a first application version number of an application residing on (or executing on) the second computing device. The system includes means for updating a first database table using an object type associated with the application ID and the first application version number. The object type identifying a database table schema of a data object used by the application and a plurality of data fields of the data object. The system includes means for receiving a second application version number from a third computing device of the plurality of computing devices. The second application version number is associated with the application residing on (or executing on) the third computing device, in response to a communication of a notification of updated data fields of the plurality of data fields of the data object to the third computing device. The system includes means for selecting one or more data fields of the updated data fields, based on the second application version number. The system includes means for communicating data stored by the one or more data fields of the updated data fields to the third computing device for synchronization.

In a first implementation form of the system according to the fourth aspect as such, the first database table is an application version history table mapping the first application version number to the object type and to an object type version number.

In a second implementation form of the system according to the fourth aspect as such, the system further includes means for updating a second database table based on the object type. The second database table maps the object type version number to the object type and to the plurality of data fields of the data object.

In a third implementation form of the system according to the fourth aspect as such, the system further includes means for determining an object type version number used by the application residing on the third computing device, the determining using the first database table.

In a fourth implementation form of the system according to the fourth aspect as such, the system further includes means for determining the one or more data fields of the updated data fields using the object type version number used by the application residing on the third computing device and using the second database table.

Any one of the foregoing examples may be combined with any one or more of the other foregoing examples to create a new embodiment within the scope of the present disclosure.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

DETAILED DESCRIPTION

Figure 1:
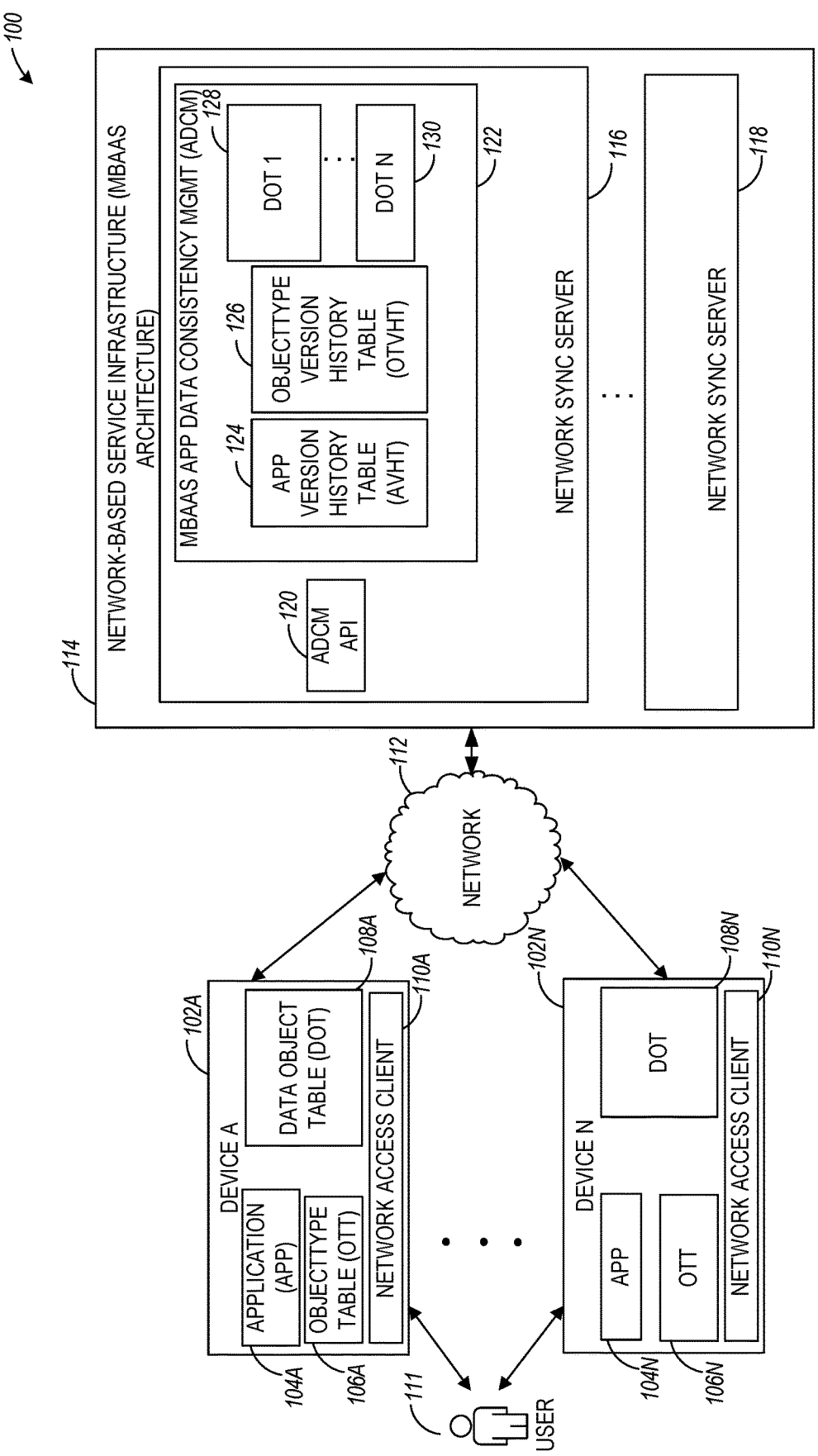
FIG. 1 is a high-level system overview of a network architecture using app data consistency management (ADCM) functionalities, according to some example embodiments.

It should be understood at the outset that although an illustrative implementation of one or more embodiments is provided below, the disclosed systems and/or methods described in connection with FIGS. 1-10 may be implemented using any number of techniques, whether currently known or not yet in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In the following description, reference is made to the accompanying drawings that form a part hereof, and in which are shown, by way of illustration, specific embodiments which may be practiced. These embodiments are described in sufficient detail to enable those skilled in the art to practice the inventive subject matter, and it is to be understood that other embodiments may be utilized, and that structural, logical, and electrical changes may be made without departing from the scope of the present disclosure. The following description of example embodiments is, therefore, not to be taken in a limiting sense, and the scope of the present disclosure is defined by the appended claims.

As used herein, the term "network-based service infrastructure" includes a plurality of network devices (also referred to as hosts, nodes, or servers) providing on-demand computing capacity (e.g., to perform data synchronization functionalities via one or more virtual machines or other virtual resources running on the network devices) and storage capacity as a service to a community of end-recipients (e.g., customers of the service infrastructure), where the end-recipients are communicatively coupled to the network devices within the service infrastructure via a network. The customers of the service infrastructure can use one or more computing devices (also referred to as customer devices or user devices) to access and manage the services (including MBaaS) provided by the service infrastructure via the network. The customer devices, the network, and the network-based service infrastructure can be collectively referred to as a "network architecture." The customers of the service infrastructure can also be referred to as "users."

As used herein, the term "schema" indicates a column layout for a database table, and the term "tuple" indicates a row layout (i.e., the data) for a database table. As used herein, the term "ObjectType" (or "Object Type") identifies a type of a data object, such as a database table schema of the data object. As used herein, the term "Object" (or "data object") indicates an abstraction (or mapping) of a database table tuple within a storage layer of a computing device. As used herein, the term "field" (or "data field") indicates an attribute of a data object. For example, "Student" may be an ObjectType that describes a student, while "Student ID" may be a field in the ObjectType "Student."

As used herein, the term "application version" indicates a version of an application residing on or executing on a computing device. Application versions of the same app residing on or executing on different devices owned by the same user may not be the same. As used herein, the term "ObjectType version" indicates the version of an Object-Type used by a particular version of an app. Since updating an app does not necessarily include updating all the Object-Types (i.e., all of the types of data objects) used by the app, an ObjectType can have its own version.

Applications may be configured to synchronize (or sync) data changes across devices on different versions of an app in a real-time manner. Techniques disclosed herein may be used for real-time app data sync among computing devices in a communication network (e.g., a wireless ad hoc network), with a network server (e.g., a cloud backend server in an MBaaS architecture) performing the centralized coordination via an application data consistency management (ADCM) module.

In some aspects, computing devices executing an app include an ObjectType Table (OTT), which maps a type of data object (e.g., an ObjectType) used by the app to its data fields, as well as a data object table (DOT) of the data object. Put another way, the ObjectType identifies a database table schema of the data object used by the app. The DOT provides specific data (used by the app) for the data fields associated with the data object (of the ObjectType identified by the OTT). In this regard, a DOT can be configured in the computing device for each ObjectType identified by the OTT.

The ADCM module (e.g., with the MBaaS architecture) uses the following tables to perform application data consistency management among a plurality of computing devices: (a) an Application Version History Table (AVHT) mapping the application version to an ObjectType and a version of the ObjectType and (b) an ObjectType Version History Table (OTVHT) mapping the ObjectType version to the ObjectType and its data fields.

While each computing device is executing an app (associated with an app ID and an application version), the ADCM module maintains the application version history (in the AVHT) and the ObjectType version history (in the OTVHT). The ADCM module syncs data from one or more data object tables to computing devices based on the version of the app the computing device is executing and using the AVHT and the OTVHT. At schema upgrade time (e.g., when an app is updated on a computing device resulting in an update of an ObjectType used by the app), the data objects on that device are upgraded to a higher version (associated with the upgraded app), and data stored by the data objects is synchronized by the ADCM module using the AVHT and the OTVHT. During the data synchronization, only additive data object changes are used for synchronization, resulting in more efficient real-time synchronization of app data.

Figure 9:
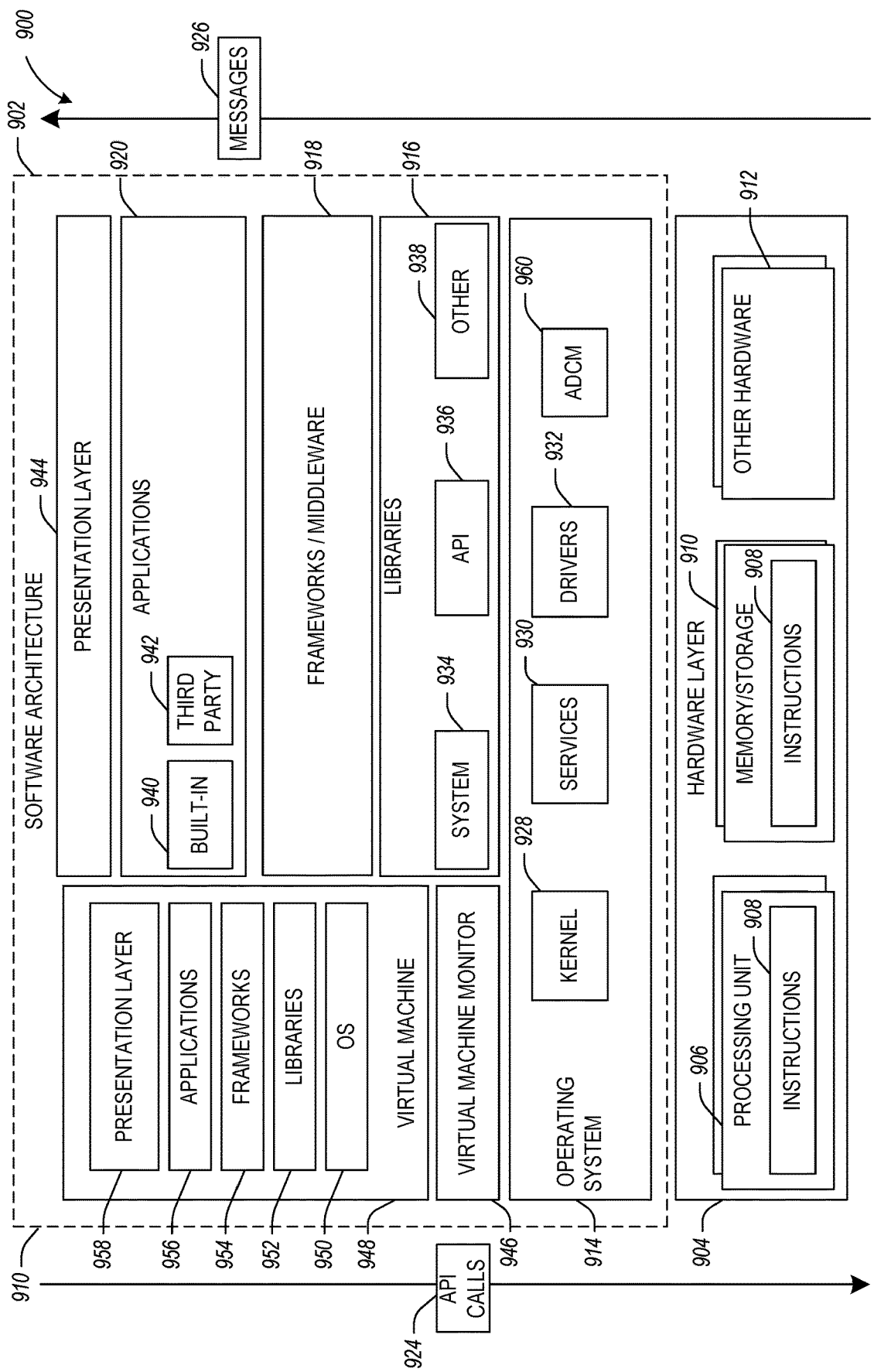
FIG. 9 is a block diagram illustrating a representative software architecture, which may be used in conjunction with various device hardware described herein, according to some example embodiments.

Data sync functionalities discussed herein can be performed by an ADCM module and can include configuring one or more of the OTT, the AVHT, and the OTVHT at each computing device within a communication network. More specifically, in one example embodiment (e.g., in connection with a peer-to-peer network), an ADCM module can be configured at each computing device as part of the device operating system (e.g., as illustrated in FIG. 9) or can be installed as an application. In another example embodiment, the ADCM module can be configured to execute only at a centralized network server (e.g., network synchronization server 116), which is accessible by multiple computing devices. Once an app is installed at a computing device, the ADCM module at the centralized network server detects the app download or installation (e.g., via a notification message from the device or the communication of a synchronization request), and causes the generation of the OTT and DOT at the computing device. The ADCM module also generates the AVHT and the OTVHT at the centralized network server for purposes of performing the data sync functionalities discussed herein.

Some benefits of the disclosed app data consistency management techniques include communication and syncing of data between devices (e.g., smartphones, tablets, laptop computers, etc.) at different application versions with minimal delay. App upgrades at one device do not necessitate upgrades on other connected devices executing the same app. The app upgrades can be stalled and restarted from the state it was left off. Even in the absence of an MBaaS network, upgrade of apps and application data consistency management can be fully supported on a peer-to-peer (P2P) basis, where each device can be configured to operate as if it were a device coupled to an MBaaS architecture with ADCM functionalities.

FIG. 1 is a high-level system overview of a network architecture using app data consistency management (ADCM) functionalities, according to some example embodiments. Referring to FIG. 1, the network architecture 100 can include a plurality of devices (e.g., user devices) 102A, . . . , 102N (collectively, devices 102) communicatively coupled to a network-based service infrastructure (e.g., MBaaS architecture) 114 via a network 112. The devices 102A, . . . , 102N are associated with user 111 and can be configured to interact with the network-based service infrastructure 114 using a network access client, such as one of clients 110A, . . . , 110N. For clarity, the devices 102A, . . . , 102N may be referred to in the aggregate as devices 102. The network access clients 110A, . . . , 110N can be implemented as web clients or application (app) clients.

Devices 102A, . . . , 102N (collectively also referred to as devices 102) further include corresponding apps 104A, . . . , 104N, OTTs 106A, . . . , 106N, and DOTs 108A, . . . , 108N. Apps 104A, . . . , 104N can be different versions (or the same version) of an app. Each of the OTTs 106A, . . . , 106N maps a type of data object (or ObjectType) used by a corresponding one of the apps 104A, . . . , 104N to its data fields. Each of the DOTs 108A, . . . , 108N provides specific data (used by the app) for the data fields associated with the data object of the ObjectType identified by the corresponding OTT.

User 111 may be a human user (e.g., a human being), a machine user (e.g., a computer configured by a software program to interact with the devices 102 and the network-based service infrastructure 114), or any suitable combination thereof (e.g., a human assisted by a machine or a machine supervised by a human). The user 111 is not part of the network architecture 100 but is associated with (and maybe a user of) devices 102 (e.g., the user 111 may be an owner of the devices 102). For example, the devices 102 may include a desktop computer, a vehicle computer, a tablet computer, a navigational device, a portable media device, or a smartphone belonging to user 111. User 111 can use devices 102A, . . . , 102N to access services that the user is subscribing to (e.g., MBaaS-related services including application data consistency management services) provided by the ADCM module 122 within the network-based service infrastructure 114. In this regard, user 111 can also be referred to as "customer 111" or "tenant 111" of the network-based service infrastructure 114.

The network 112 may be any network that enables the communication between or among machines, databases, and devices (e.g., devices 102A, . . . , 102N and network sync servers 116, . . . , 118 within the MBaaS architecture 114). Accordingly, the network 112 may be a wired network, a wireless network (e.g., a mobile or a cellular network), or any suitable combination thereof. The network 112 may include one or more portions that constitute a private network, a public network (e.g., the Internet), or any suitable combination thereof.

The network-based service infrastructure 114 can include a plurality of computing devices (e.g., network sync servers 116, . . . , 118). FIG. 1 illustrates in greater detail network sync server 116, which includes an MBaaS ADCM module 122 and an ADCM application programming interface (API) 120.

The MBaaS ADCM module 122 comprises suitable circuitry, logic, interfaces, and/or code and is configured to perform application data consistency management among a plurality of computing devices communicatively coupled to the MBaaS architecture 114, such as devices 102A, . . . , 102N of user 111. More specifically, the MBaaS ADCM module 122 maintains DOTs 128, . . . , 130 (with data objects used by the apps 104A, . . . , 104N executing on devices 102A, . . . , 102N), application version history table (AVHT) 124 (mapping an application version to an ObjectType and a version of the ObjectType), and ObjectType version history table (OTVHT) 126 (mapping the ObjectType version to the ObjectType and its fields). Additionally, the MBaaS ADCM module 122 syncs data stored by the data objects in the DOTs 128, . . . , 130 with one or more of devices 102A, . . . , 102N based on the application version that resides on or is executing on each device and using the AVHT 124 and the OTVHT 126. A more detailed description of DOTs is provided in connection with FIG. 2 and FIG. 5. A more detailed description of application data consistency management by the MBaaS ADCM module 122 is provided in connection with FIG. 3 and FIG. 4. A more detailed description of application data consistency management by ADCM modules within devices in a P2P network is provided in connection with FIG. 6 and FIG. 7.

Any of the devices shown in FIG. 1 may be implemented in a general-purpose computer that is modified (e.g., configured or programmed) by software to be a special-purpose computer to perform the functions described herein for that machine, database, or device. As used herein, a "database" is a data storage resource that stores data structured as a text file, a table, a spreadsheet, a relational database (e.g., an object-relational database, a NoSQL database, a network or graph database), a triple store, a hierarchical data store, or any suitable combination thereof. Additionally, data accessed (or stored) via an application programming interface (API) or remote procedure call (RPC) may be considered to be accessed from (or stored to) a database. Moreover, any two or more of the devices or databases illustrated in FIG. 1 may be combined into a single machine, database, or device, and the functions described herein for any single machine, database, or device may be subdivided among multiple machines, databases, or devices.

Figure 2:
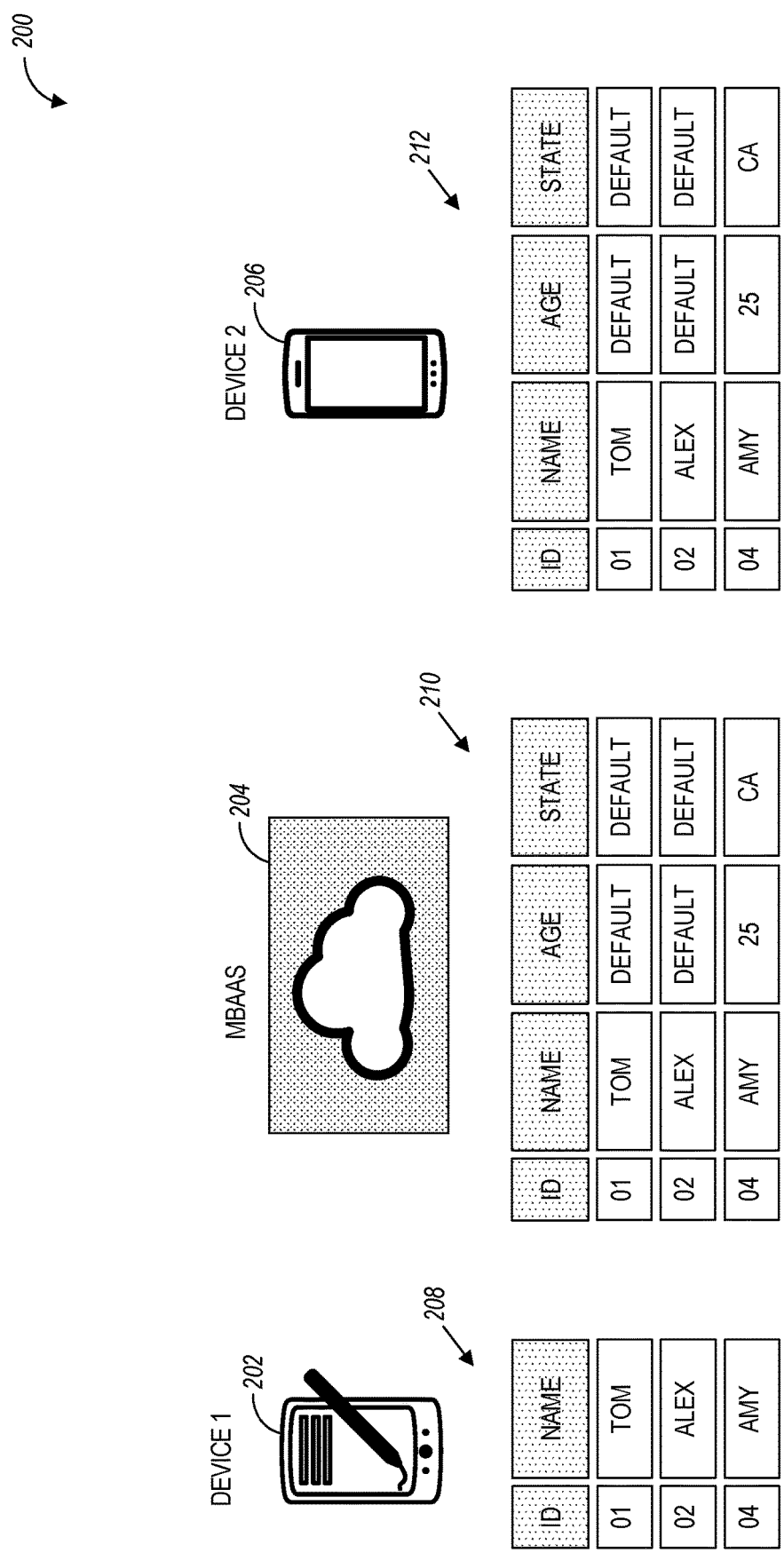
FIG. 2 is a block diagram illustrating data object tables used by different versions of an app executing on different computing devices within a communication network, according to some example embodiments.

FIG. 2 is a block diagram 200 illustrating data object tables used by different versions of an app executing on different computing devices within a communication network, according to some example embodiments. Referring to FIG. 2, device 202 may be executing the first version of an app, which uses DOT 208 with data fields "ID" and "NAME." For example, the first version of the app executing on device 202 uses an ObjectType "Student" with data fields "ID" and "NAME" describing a "Student" data object, and DOT 208 provides data associated with the data fields of the data object.

Device 206 may be executing the second version of an app, which uses DOT 212 with data fields "ID", "NAME", "AGE", and "STATE." For example, the second version of the app executing on device 206 uses an upgraded version of the ObjectType "Student" with data fields "ID" and "NAME" (appearing in DOT 208) with additional (new) fields "AGE" and "STATE", forming DOT 212 of the upgraded "Student" data object. The MBaaS architecture 204 is configured with DOT 210, which is the same as the DOT used by the latest version of the app (e.g., DOT 212 of the upgraded "Student" data object used by the app executing on device 206). An MBaaS ADCM module of the MBaaS architecture 204 uses application data consistency management techniques discussed herein to perform synchronization of data (e.g., data from one or more of the data fields in the DOT 210) among multiple devices (e.g., devices 202 and 206) executing the same or different versions of an app.

Figure 3:
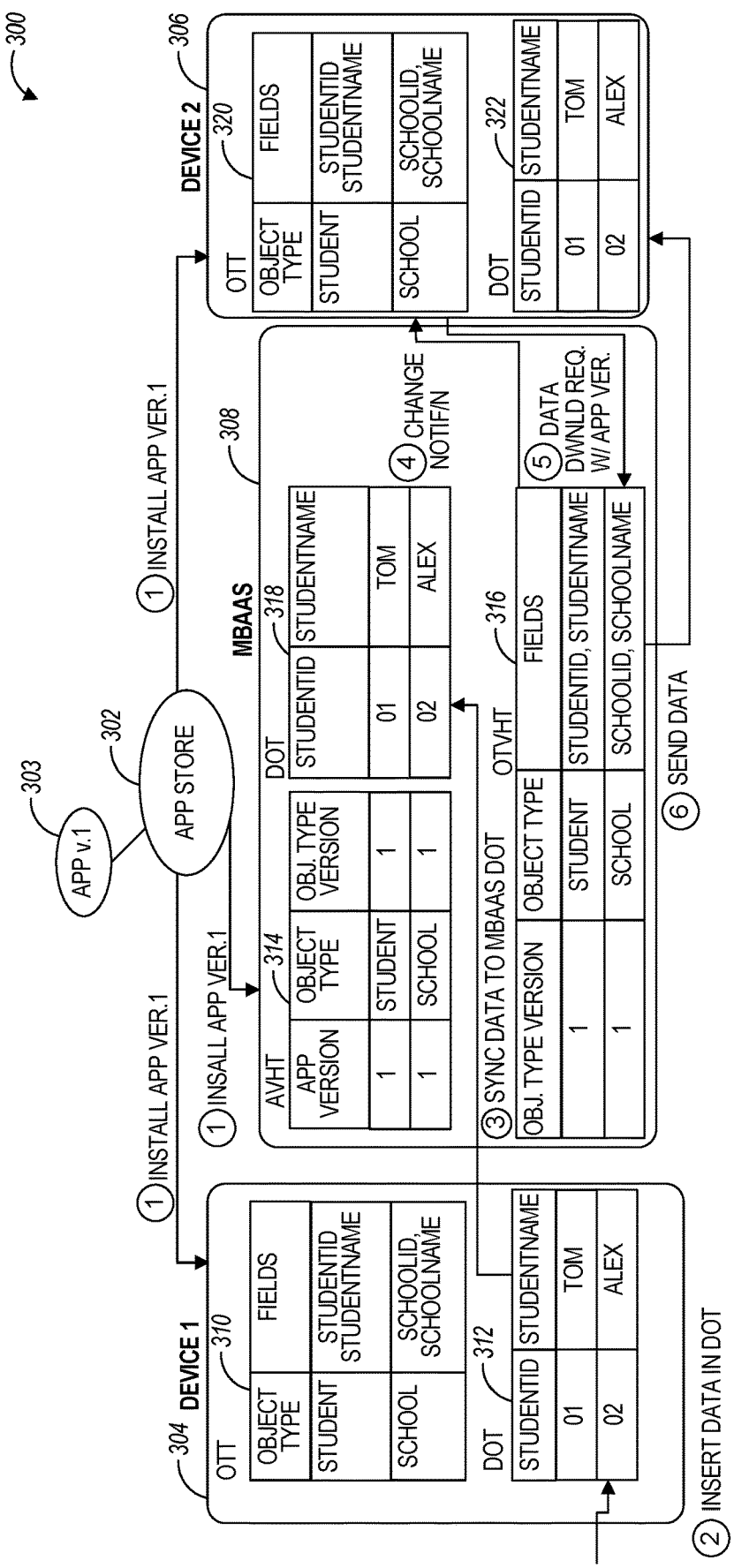
FIG. 3 is a block diagram illustrating initial app installation at multiple computing devices within a communication network and initial configuration of database tables used for data consistency management, according to some example embodiments.

FIG. 3 is a block diagram 300 illustrating initial app installation at multiple computing devices within a communication network and initial configuration of database tables used for data consistency management, according to some example embodiments. FIG. 3 further illustrates app data consistency management operations 1-6 indicated with circled numbers.

Referring to FIG. 3, devices 304 and 306 and the MBaaS architecture 308 form a communication network, such as an ad hoc wireless network or other type of network. Device 304 is configured with OTT 310 and DOT 312. Device 306 is configured with OTT 320 and DOT 322. The MBaaS architecture 308 includes an ADCM module (not illustrated in FIG. 3) configured with an AVHT 314, an OTVHT 316, and a DOT 318.

At operation 1, the app store 302 installs an app 303 at, e.g., device 304. For example, application code for app 303 is downloaded at device 304 and the ADCM module executes the application code to install app 303. App 303 is associated with application identification (ID) and an application version number (e.g., application version 1). The installation of app 303 at device 304 causes the generation of OTT 310 specifying the ObjectTypes used by the app 303. More specifically, app 303 uses an ObjectType "Student" with data fields STUDENT ID and STUDENT NAME, as well as ObjectType "School" with data fields SCHOOL ID and SCHOOL NAME. The installation of app 303 on device 304 further causes the generation of corresponding DOTs with the data objects of the ObjectTypes specified by OTT 310. For example, FIG. 3 illustrates that device 304 is configured with DOT 312 of the data object of type "Student." More specifically, DOT 312 provides data for the data fields STUDENT ID and STUDENT NAME for the data object of type "Student."

In an example embodiment, the app store 302 installs an app 303 at one or more additional devices (e.g., device 306) associated with the user of device 304. The installation of app 303 on device 306 causes the generation of OTT 320 specifying the ObjectTypes used by the app 303 at device 306. More specifically, app 303 uses an ObjectType "Student" with data fields STUDENT ID and STUDENT NAME, as well as ObjectType "School" with data fields SCHOOL ID and SCHOOL NAME. The installation of app 303 on device 306 further causes the generation of corresponding DOTs with the data objects of the ObjectTypes specified by OTT 320. For example, FIG. 3 illustrates that device 306 is configured with DOT 322 of the data object of type "Student." More specifically, DOT 322 provides data for the data fields STUDENT ID and STUDENT NAME for the data object of type "Student." Even though FIG. 3 illustrates that device 304 and device 306 are configured with DOTs 312 and 322 for a data object of type "Student", other DOTs may also be configured for data objects of other ObjectTypes used by the app 303 (e.g., a DOT for a data object of type "School").

In an example embodiment, after the app 303 is installed on device 304, application data is communicated to the MBaaS architecture 308 (or the MBaaS architecture 308 retrieves the application data from device 304 based on a notification that app 303 is installed on device 304). The application data from device 304 includes the application ID and the application version number of app 303. In some aspects, the application data further includes user information identifying a user authorized to use the app on device 304 (e.g., the user of device 304 who initiated the download and the installation of app 303 from the app store 302). The ADCM module in the MBaaS architecture 308 uses the application data to determine if the user has downloaded and installed app 303 on another device.

If device 304 is the only device with app 303, the ADCM module installs app 303 in the MBaaS architecture 308 (e.g., on a network sync server hosting the ADCM module, for example), and configures the AVHT 314, the OTVHT 316, and the DOT 318 to sync the database table schema of each data object used by the app 303 at device 304. If the ADCM module determines that the user has downloaded and installed app 303 on another device (e.g., device 306), the ADCM module verifies if app 303 installed at device 306 has the same version as the version installed in the MBaaS architecture 308. If app 303 at device 306 is not the same version as app 303 installed in the MBaaS architecture 308, the ADCM module synchronizes the database table schema of the data objects (e.g., the ObjectTypes specified by the AVHT 314 and the OTVHT 316) to match the database table schema of the data objects used by the version of app 303 installed at device 306.

FIG. 3 illustrates AVHT, OTVHT, and DOT configuration at the MBaaS architecture 308 when the same application version (e.g., application version 1) of app 303 is installed at device 304, device 306, and the network synchronization server 116 hosting the ADCM module (e.g., ADCM module 122) in the MBaaS architecture 308. After the MBaaS architecture 308 receives the application data from device 304, the ADCM module installs app 303 on the network synchronization server in MBaaS architecture 308 and determines (e.g., based on the application data) the ObjectTypes associated with app 303. For example, the ADCM module determines that app 303 uses ObjectType "Student" with data fields STUDENT ID and STUDENT NAME, as well as ObjectType "School" with data fields SCHOOL ID and SCHOOL NAME.

The ADCM module then configures AVHT 314 to map the application version number (e.g., application version 1) to the ObjectType and the ObjectType version. In some aspects, when an app is upgraded, an ObjectType may or may not be upgraded. In this regard, an ObjectType version can indicate a different version for the same ObjectType, with different versions having one or more different data fields. To account for the possibility of the same ObjectType having different versions used by different versions of the same app, the ADCM module further configures the OTVHT 316, which maps an ObjectType version to the corresponding ObjectType and its data fields. For example, OTVHT 316 maps ObjectType version 1 of ObjectType "Student" to data fields STUDENT ID and STUDENT NAME of the data object. Similarly, OTVHT 316 also maps ObjectType version 1 of ObjectType "School" to data fields SCHOOL ID and SCHOOL NAME of the data object.

At operation 2, new data (e.g., (01; Tom) and (02; Alex)) is entered in DOT 312 for the data object of type "Student." At operation 3, the new data added to DOT 312 is synchronized with the MBaaS architecture 308 and added to DOT 318, updating the corresponding data fields of the DOT. At operation 4, a notification of the updated data fields of DOT 318 is communicated to device 306. At operation 5, device 306 communicates a data download request to the ADCM module of the MBaaS architecture 308, which includes the application version number of app 303 installed at device 306.

At operation 6, the ADCM module of the MBaaS architecture 308 checks the AVHT 314 against the application version number received from device 306 to determine the ObjectTypes and ObjectType versions used by the application version. The ADCM module determines the data fields associated with each of the ObjectTypes used by the application version executing on device 306, using the OTVHT 316. The ADCM module determines which data fields of the updated data fields of DOT 318 are used by DOT 322, and communicates data stored by such data fields in DOT 318 to device 306 for synchronization (e.g., updating DOT 322 using the communicated data).

In an example embodiment, the application data (including the user information) is used by the ADCM module in the MBaaS architecture 308 to perform a verification whether the user is authorized to use the application on one or more additional devices (e.g., device 306). Additionally, the data stored by the data fields in DOT 318 is communicated to device 306 for synchronization when the verification is successful. If the verification is unsuccessful, the ADCM module generates a notification that the user is not authorized to access device 306 and the synchronization is suspended.

Figure 4:
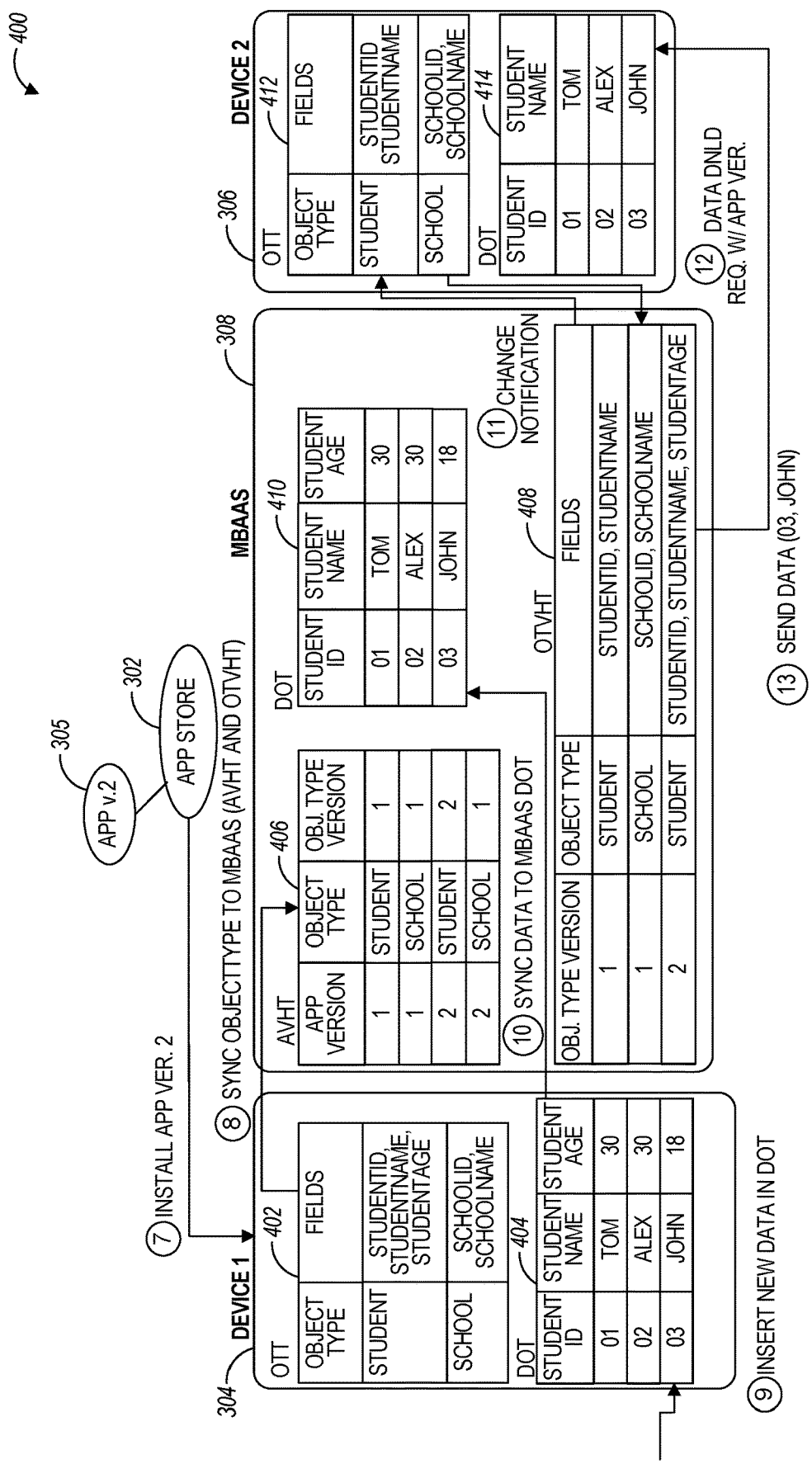
FIG. 4 is a block diagram illustrating an app upgrade within the communication network of FIG. 3 including updating of the database tables used for data consistency management, according to some example embodiments.

FIG. 4 is a block diagram 400 illustrating an app upgrade within the communication network of FIG. 3 including updating of the database tables used for data consistency management, according to some example embodiments. FIG. 4 further illustrates app data consistency management operations 7-13 indicated with circled numbers.

Referring to FIG. 4, device 304 is configured with OTT 402 and DOT 404. Device 306 is configured with OTT 412 and DOT 414. The MBaaS architecture 308 includes an ADCM module (not illustrated in FIG. 4) configured with an AVHT 406, an OTVHT 408, and a DOT 410.

At operation 7, the app store 302 installs app 305 (which is an upgraded application version 2 of app 303) at devices 304 and 306. The app 305 is associated with app ID (which is the same as the app ID of app 303) and an application version number (e.g., application version 2). The installation of app 305 on device 304 causes the update of ObjectType "Student" to include an additional data field STUDENT AGE, while ObjectType "School" remains the same, without changes to any of the data fields. Consequently, OTT 310 is updated to OTT 402 to reflect the updated data fields used by the ObjectType "Student."

In an example embodiment, after the app 305 is installed on device 304, application data is communicated to the MBaaS architecture 308 (or the MBaaS architecture 308 retrieves the application data from device 304 based on a notification that app 305 is installed on device 304). The application data from device 304 includes the application ID and the application version number of app 305. In some aspects, the application data further includes user-related information associated with the user of device 304 (e.g., the user of device 304 who initiated the download and the installation of app 305 from the app store 302). The ADCM module in the MBaaS architecture 308 uses the application data to determine if the user has downloaded and installed app 305 on another device.

If device 304 is the only device with app 305 and the database tables of the ADCM module in the MBaaS architecture 308 are not updated based on the ObjectTypes used by app 305, at operation 8, device 304 synchronizes the updated ObjectType "Student" (as well as any other updated ObjectTypes in the OTT 402) with the database tables configured by the ADCM module within the MBaaS architecture 308. More specifically, AVHT 314 is updated to AVHT 406 by including database table entries for ObjectTypes "Student" and "School" associated with application version 2. For example, AVHT 406 indicates that the same ObjectType version 1 is used for ObjectType "School" in application version 2, but ObjectType version 2 is used for ObjectType "Student" in application version 2 (which corresponds to the updated DOT 404 with three data fields). Additionally, OTVHT 316 is upgraded to OTVHT 408 by including database table entries for ObjectType version 2 of ObjectType "Student", mapping to its three corresponding data fields (STUDENT ID, STUDENT NAME, and STUDENT AGE). DOT 318 is also updated to include all three data fields of the data object of type "Student."

At operation 9, new data is inserted in DOT 404 at device 304. More specifically, data for field STUDENT ID 03 as well as data for field STUDENT AGE (for STUDENT IDs 01 and 02) are added to DOT 404. At operation 10, the new data added to DOT 404 is synchronized with the MBaaS architecture 308 and added to DOT 410, updating the corresponding data fields of the DOT. At operation 11, a notification of the updated data fields of DOT 410 is communicated to device 306. At operation 12, device 306 communicates a data download request to the ADCM module of the MBaaS architecture 308, which includes the application version number (e.g., application version 1) of app 303 installed at device 306.

At operation 13, the ADCM module of the MBaaS architecture 308 checks the AVHT 406 against the application version number received from device 306 to determine the ObjectTypes and ObjectType versions used by the application version at device 306. Since device 306 is executing the previous version (application version 1) of the app, ObjectType versions 1 corresponding to application version 1 are used for synchronization. The ADCM module then determines the data fields associated with each of the ObjectTypes used by the application version executing on device 306 using the OTVHT 408. The ADCM module then determines that the STUDENT ID and STUDENT NAME data fields of the updated data fields of DOT 410 are used by DOT 414, and communicates the data stored by such data fields (i.e., 03; JOHN) in DOT 410 to device 306 for synchronization (e.g., updating DOT 414 using the communicated data). In this regard, only additive data object changes are used for the data synchronization, resulting in more efficient real-time synchronization of app data. Put another way, only data used by the corresponding application version is being communicated, and data associated with data fields that are not being used by the application version are not communicated for synchronization.

Figure 5:
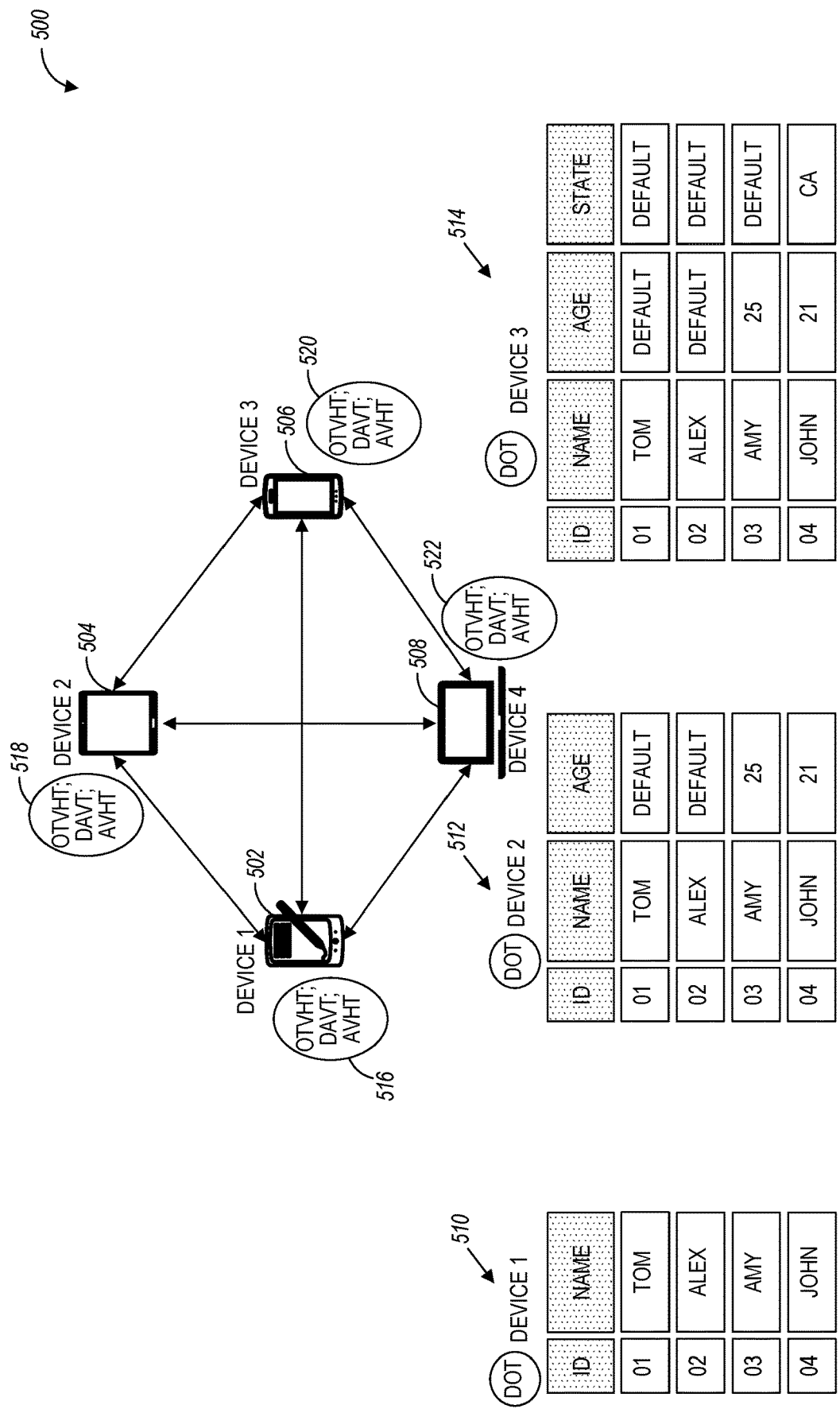
FIG. 5 is a block diagram illustrating data object tables used by different versions of an app executing on different computing devices within a communication network, according to some example embodiments.

FIG. 5 is a block diagram illustrating data object tables used by different versions of an app executing on different computing devices within a communication network 500, according to some example embodiments. Referring to FIG. 5, the communication network 500 is a P2P communication network formed by devices 502, 504, 506, and 508. FIG. 5 further illustrates the DOTs used by the app executing on devices 502, 504, and 506. More specifically, device 502 may be executing a first version of the app, which uses DOT 510 with data fields "ID" and "NAME." For example, the first version of the app executing on device 502 uses an ObjectType "Student" with data fields "ID" and "NAME" describing a "Student" data object, and DOT 510 provides data associated with the data fields of the data object. FIG. 5 further illustrates that each of devices 502-508 is configured with additional tables such as an OTVHT, an AVHT, and a device application version table (DAVT). More specifically, devices 502, 504, 506, and 508 are configured with corresponding additional tables 516, 518, 520, and 522. The functionalities of the additional tables are discussed in connection with FIG. 6.

Device 504 may be executing a second version of the app, which uses DOT 512 with data fields "ID", "NAME", and "AGE." For example, the second version of the app executing on device 504 uses an upgraded version of the ObjectType "Student" with data fields "ID" and "NAME" (appearing in DOT 510) with an additional (new) field "AGE", forming DOT 512 of the upgraded "Student" data object.

Device 506 may be executing a third version of the app, which uses DOT 514 with data fields "ID", "NAME", "AGE", and "STATE." For example, the third version of the app executing on device 506 uses an upgraded version of the ObjectType "Student" with data fields "ID", "NAME", and "AGE" (appearing in DOT 512) with an additional (new) field "STATE", forming DOT 514 of the upgraded "Student" data object.

In comparison with the network architecture 100, the P2P communication network 500 does not include a network entity (such as the MBaaS ADCM module 122 configured on network synchronization server 116) to coordinate application data consistency management among a plurality of computing devices. Instead, each of the devices 502, 504, 506, and 508 within the P2P communication network 500 will be configured with its ADCM module with the database tables used for app data consistency management, including AVHT, OTVHT, and DOT. Additionally, each of the devices 502, 504, 506, and 508 within the P2P communication network 500 is also configured with a device application version table (DAVT), which indicates the application version number executing within each device within the P2P network 500. A more detailed description of the application data consistency management among a plurality of computing devices within a P2P communication network is provided in connection with FIG. 6 and FIG. 7.

Figure 6:
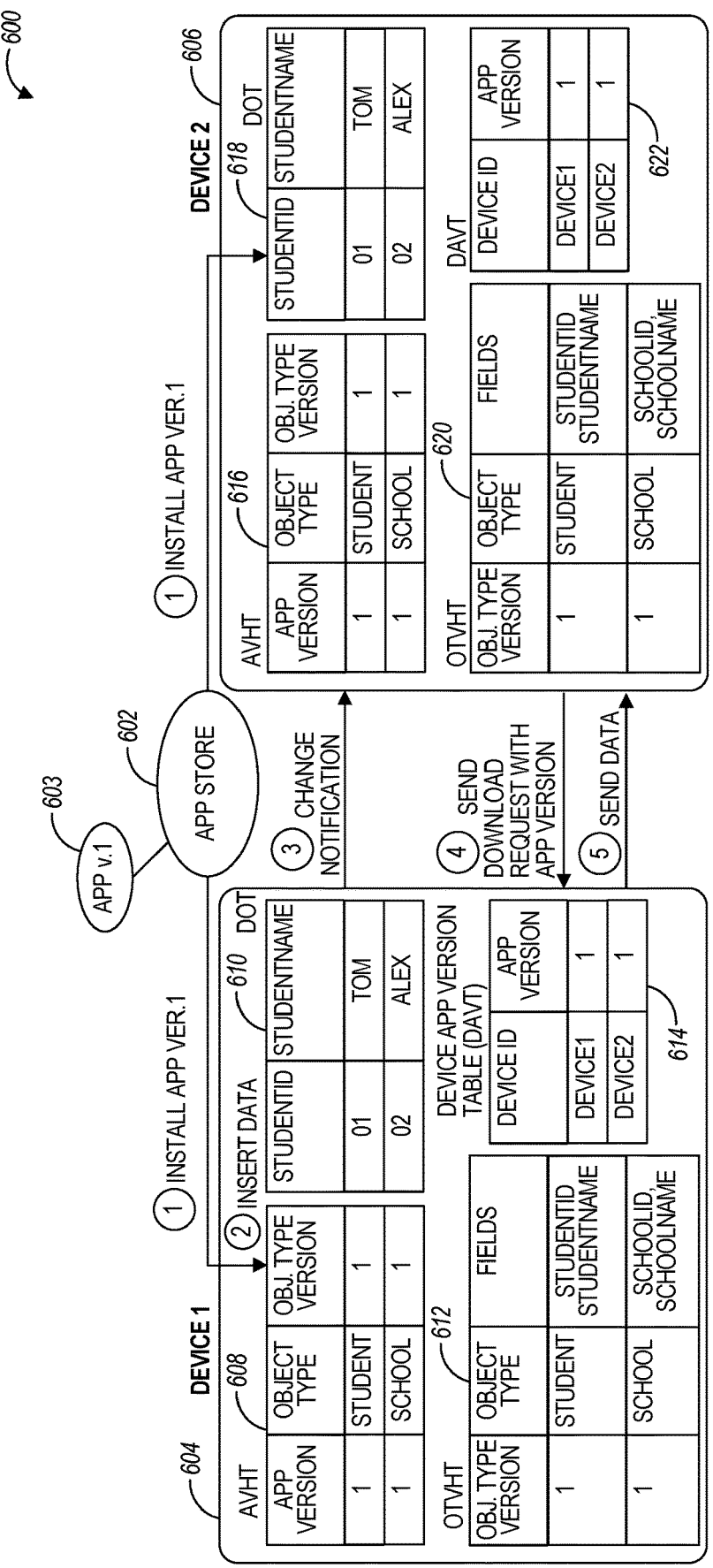
FIG. 6 is a block diagram illustrating initial app installation at multiple computing devices within a communication network and initial configuration of database tables used for data consistency management, according to some example embodiments.

FIG. 6 is a block diagram 600 illustrating initial app installation at multiple computing devices within a communication network (e.g., a P2P communication network) and initial configuration of database tables used for data consistency management, according to some example embodiments. FIG. 6 further illustrates app data consistency management operations 1-5 indicated with circled numbers.

Referring to FIG. 6, devices 604 and 606 form a P2P communication network. Device 604 is configured with AVHT 608, DOT 610, OTVHT 612, and device application version table (DAVT) 614. Device 606 is configured with AVHT 616, DOT 618, OTVHT 620, and DAVT 622. The AVHT, DOT, and OTVHT database tables illustrated in FIG. 6 have similar functionalities to the AVHT, DOT, and OTVHT database tables discussed in connection with FIG. 3. DAVTs 614 and 622 are configured to store the application version number of the app executing at each device within the P2P network.

At operation 1, the app store 602 installs an app 603 (with application version 1) at device 604. For example, application code for app 603 is downloaded at device 604 and the ADCM module within the device executes the application code to install app 603. The app 603 is associated with an application ID and an application version number (e.g., application version 1). The installation of app 603 at device 604 causes the generation of AVHT 608 (mapping the application version number to an ObjectType used by the app and an ObjectType version number) and OTVHT 612 (mapping the ObjectType version number to the ObjectType and the data fields within the data object associated with the ObjectType).

As illustrated in FIG. 6, app 603 executing on device 604 uses an ObjectType "Student" with data fields STUDENT ID and STUDENT NAME, as well as ObjectType "School" with data fields SCHOOL ID and SCHOOL NAME. The installation of app 603 on device 604 further causes the generation of corresponding DOTs with the data objects of the ObjectTypes specified by the OTVHT 612. For example, FIG. 6 illustrates that device 604 is configured with DOT 610 of the data object of type "Student." More specifically, DOT 610 provides data for the data fields STUDENT ID and STUDENT NAME for the data object of type "Student."

In an example embodiment, the app store 602 installs the app 603 at one or more additional devices within the P2P network (e.g., device 606) associated with the user of device 604. The installation of app 603 on device 606 causes the generation of AVHT 616 (mapping the application version number to an ObjectType used by the app and an ObjectType version number) and OTVHT 620 (mapping the ObjectType version number to the ObjectType and the data fields within the data object associated with the ObjectType).

As illustrated in FIG. 6, app 603 executing on device 606 uses an ObjectType "Student" with data fields STUDENT ID and STUDENT NAME, as well as ObjectType "School" with data fields SCHOOL ID and SCHOOL NAME. The installation of app 603 on device 606 further causes the generation of corresponding DOTs with the data objects of the ObjectTypes specified by the OTVHT 620. For example, FIG. 6 illustrates that device 606 is configured with DOT 618 of the data object of type "Student." More specifically, DOT 618 provides data for the data fields STUDENT ID and STUDENT NAME for the data object of type "Student."

At operation 2, new data (e.g., (01; Tom) and (02; Alex)) is entered in DOT 610 for the data object of type "Student." At operation 3, a notification of the updated data fields of DOT 610 is communicated to device 606. At operation 4, device 606 communicates a data download request to the ADCM module of device 604, which includes the application version number of app 603 installed at device 606. In some aspects, the ADCM module updates the DAVT 614 with the application version number of the app executing on device 606 as received with the data download request.

At operation 5, the ADCM module of device 604 checks the AVHT 608 against the application version number received from device 606 to determine the ObjectTypes and ObjectType versions used by the application version. The ADCM module then determines the data fields associated with each of the ObjectTypes used by the application version executing on device 606 using the OTVHT 612. The ADCM module further determines which data fields of the updated data fields of DOT 610 are used by DOT 618 at device 606, and communicates data stored by such data fields in DOT 610 to device 606 for synchronization (e.g., updating DOT 618 using the communicated data).

Figure 7:
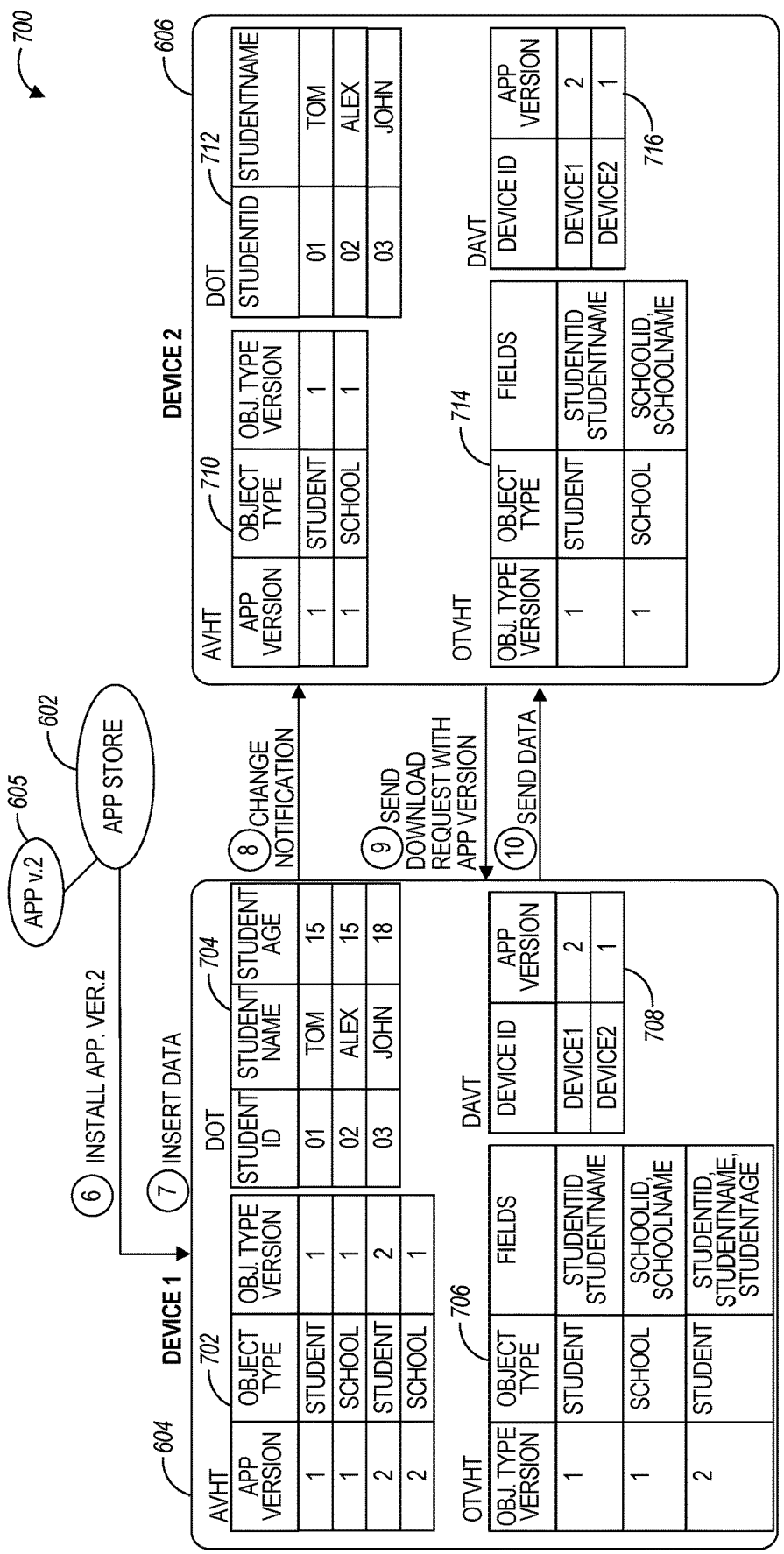
FIG. 7 is a block diagram illustrating an app upgrade within the communication network of FIG. 6 including updating of the database tables used for data consistency management, according to some example embodiments.

FIG. 7 is a block diagram 700 illustrating an app upgrade within the P2P communication network of FIG. 6 including updating of the database tables used for data consistency management, according to some example embodiments. FIG. 7 further illustrates app data consistency management operations 6-10 indicated with circled numbers.

Referring to FIG. 7, device 604 is configured with AVHT 702, DOT 704, OTVHT 706, and DAVT 708. Device 606 is configured with AVHT 710, DOT 712, OTVHT 714, and DAVT 716. The AVHT, DOT and OTVHT database tables illustrated in FIG. 7 have similar functionalities to the AVHT, DOT, and OTVHT database tables discussed in connection with FIG. 4 and FIG. 6. DAVTs 708 and 716 are configured to store the application version number of the app executing at each device within the P2P network.

At operation 6, the app store 602 installs app 605 (which is an upgraded application version 2 of app 603) at devices 604 and 606. The app 605 is associated with app ID (which is the same as the app ID of app 603) and an application version number (e.g., application version 2). The installation of app 605 on device 604 causes the update of ObjectType "Student" to include an additional data field STUDENT AGE, while ObjectType "School" remains the same, without changes to any of its data fields. Consequently, AVHT 608 is updated to AVHT 702 to reflect the updated data fields used by the ObjectType "Student" (e.g., ObjectType "Student" of ObjectType version 2 and ObjectType "School" of ObjectType version 1 are mapped for application version 2). OTVHT 612 is updated to OTVHT 706, which includes a new entry mapping ObjectType version 2 of ObjectType "Student" to the data fields of the updated data object.

As shown in FIG. 7, device 606 does not upgrade to application version 2 and remains at application version 1 (executing app 603). Consequently, AVHT 710 and OTVHT 714 remain the same as AVHT 616 and OTVHT 620.

At operation 7, new data is inserted in DOT 704 at device 604. More specifically, data for field STUDENT ID 03 (e.g., data (03; JOHN; 18)), as well as data for field STUDENT AGE (for STUDENT IDs 01 and 02), are added to DOT 704. At operation 8, a notification of the updated data fields of DOT 704 is communicated to device 606. At operation 9, device 606 communicates a data download request to the ADCM module of device 604, which includes the application version number (e.g., application version 1) of app 603 installed at device 606.

At operation 10, the ADCM module of device 604 checks the AVHT 702 against the application version number received from device 606 to determine the ObjectTypes and ObjectType versions used by the application version at device 606. Since device 606 is executing the previous version (e.g., application version 1) of the app, ObjectType versions 1 corresponding to application version 1 are used for synchronization. The ADCM module then determines the data fields associated with each of the ObjectTypes used by the application version executing on device 606 using the OTVHT 706. The ADCM module then determines that the STUDENT ID and STUDENT NAME data fields of the updated data fields of DOT 704 are used by app 603 at device 606, and communicates the data stored by such data fields (i.e., data (03; JOHN)) in DOT 704 to device 606 for synchronization (e.g., updating DOT 712 using the communicated data).

Figure 8:
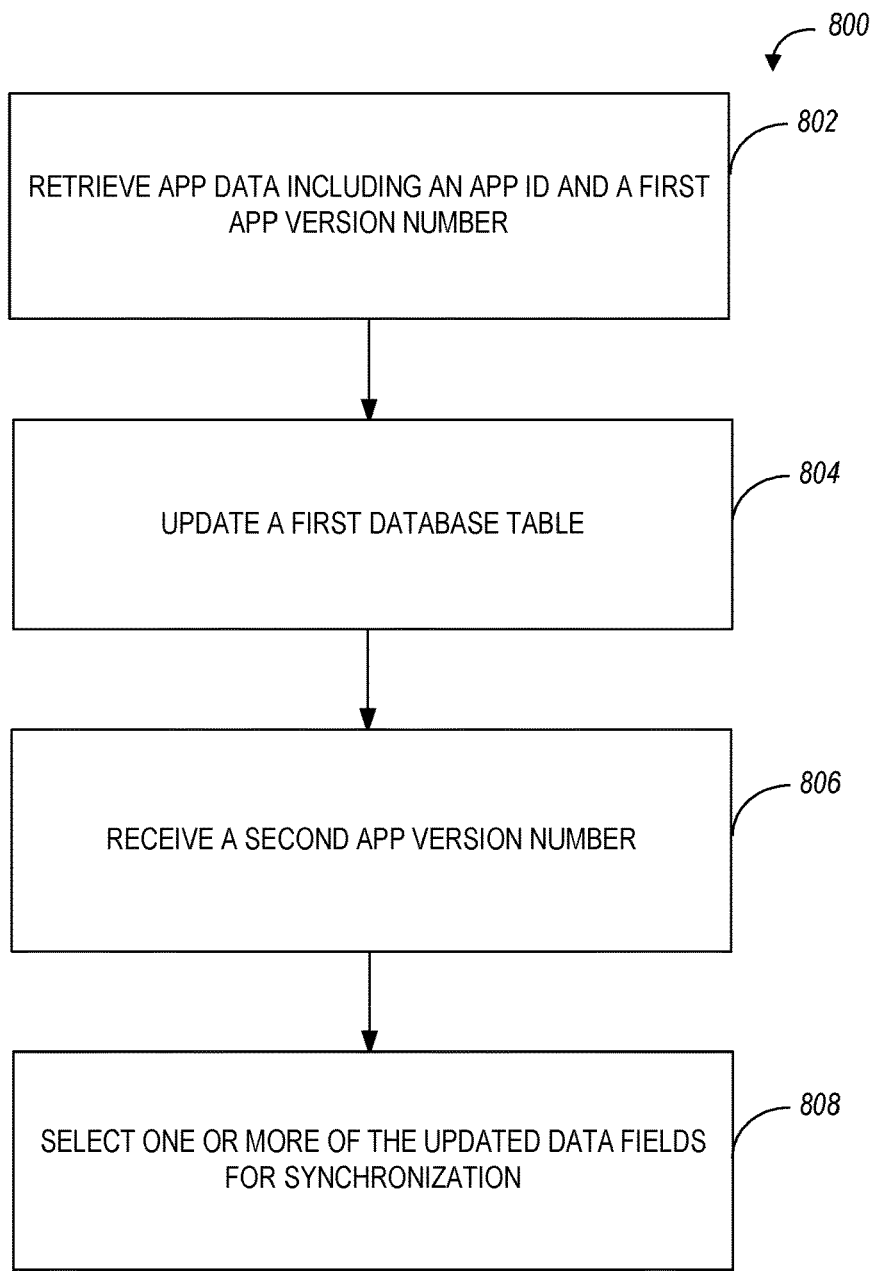
FIG. 8 is a flowchart of a method suitable for performing application data consistency management among a plurality of computing devices within a communication network, according to some example embodiments.

FIG. 8 is a flowchart of a method 800 suitable for performing application data consistency management among a plurality of computing devices within a communication network, according to some example embodiments. The method 800 includes operations 802, 804, 806, and 808. By way of example and not limitation, the method 800 may be performed by the ADCM module 122, which is configured to execute within a network sync server 116 in the MBaaS architecture 114 illustrated in FIG. 1, or by another ADCM module (e.g., as discussed in connection with FIGS. 5-7).

Referring to FIG. 8, at operation 802, application data is retrieved by a first computing device of a plurality of computing devices, from a second computing device of the plurality of computing devices. The application data includes an application identification (ID) and a first application version number of an application executing on the second computing device. At operation 804, a first database table (e.g., an AVHT) is updated by the first computing device. The updating can be performed using an object type (also referred to as ObjectType) associated with the application ID and the first application version number. The object type identifies a database table schema of a data object used by the application and a plurality of data fields of the data object.

At operation 806, the first computing device receives a second application version number from the third computing device. The second application version number in some embodiments is received in response to communicating, by the first computing device, a notification of updated data fields of the plurality of data fields of the data object to a third computing device of the plurality of computing devices. For example, the second application version number is associated with the application executing on the third computing device and is received as part of a data download request in response to the notification. At operation 808, one or more data fields of the updated data fields are selected by the first computing device for synchronization. The one or more data fields are selected in some embodiments based on the second application version number. Data stored by the one or more data fields of the updated data fields is communicated, by the first computing device, to the third computing device for synchronization.

FIG. 9 is a block diagram illustrating a representative software architecture 900, which may be used in conjunction with various device hardware described herein, according to some example embodiments. FIG. 9 is merely a non-limiting example of a software architecture 902 and it will be appreciated that many other architectures may be implemented to facilitate the functionality described herein. The software architecture 902 may be executing on hardware such as computing device 1000 of FIG. 10 that includes, among other things, processor 1005, memory 1010, storage 1015 and 1020, and I/O interfaces 1025 and 1030. A representative hardware layer 904 is illustrated and can represent, for example, the computing device 1000 of FIG. 10. The representative hardware layer 904 comprises one or more processing units 906 having associated executable instructions 908. Executable instructions 908 represent the executable instructions of the software architecture 902, including implementation of the methods, modules and so forth of FIGS. 1-8. Hardware layer 904 also includes memory and/or storage modules 910, which also have executable instructions 908. Hardware layer 904 may also comprise other hardware 912, which represents any other hardware of the hardware layer 904, such as the other hardware illustrated as part of computing device 1000.

In the example architecture of FIG. 9, the software architecture 902 may be conceptualized as a stack of layers where each layer provides particular functionality. For example, the software architecture 902 may include layers such as an operating system 914, libraries 916, frameworks/middleware 918, applications 920 and presentation layer 944. Operationally, the applications 920 and/or other components within the layers may invoke application programming interface (API) calls 924 through the software stack and receive a response, returned values, and so forth illustrated as messages 926 in response to the API calls 924. The layers illustrated in FIG. 9 are representative in nature and not all software architectures 902 have all layers. For example, some mobile or special purpose operating systems may not provide frameworks/middleware 918, while others may provide such a layer. Other software architectures may include additional or different layers.

The operating system 914 may manage hardware resources and provide common services. The operating system 914 may include, for example, a kernel 928, services 930, drivers 932, and an ADCM module 960. The kernel 928 may act as an abstraction layer between the hardware and the other software layers. For example, kernel 928 may be responsible for memory management, processor management (e.g., scheduling), component management, networking, security settings, and so on. The services 930 may provide other common services for the other software layers. The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

In some aspects, the ADCM module 960 can be the same as (and perform the same functionalities as) any of the ADCM modules discussed in connection with FIGS. 1-8, such as the ADCM module 122 including the AVHT 124, the OTVHT 126, and DOTs 128, . . . , 130.

The libraries 916 may provide a common infrastructure that may be utilized by the applications 920 and/or other components and/or layers. The libraries 916 typically provide functionality that allows other software modules to perform tasks more easily than to interface directly with the underlying operating system 914 functionality (e.g., kernel 928, services 930, drivers 932, and/or ADCM module 960). The libraries 916 may include system libraries 934 (e.g., C standard library) that may provide functions such as memory allocation functions, string manipulation functions, mathematic functions, and the like. Also, the libraries 916 may include API libraries 936 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules.

The frameworks/middleware 918 (also sometimes referred to as middleware) may provide a higher-level common infrastructure that may be utilized by the applications 920 and/or other software components/modules. For example, the frameworks/middleware 918 may provide various graphical user interface (GUI) functions, high-level resource management, high-level location services, and so forth. The frameworks/middleware 918 may provide a broad spectrum of other APIs that may be utilized by the applications 920 and/or other software components/modules, some of which may be specific to a particular operating system 914 or platform.

The applications 920 include built-in applications 940 and/or third-party applications 942. Examples of representative built-in applications 940 may include but are not limited to, a contacts application, a browser application, a book reader application, a location application, a media application, a messaging application, and/or a game application. Third-party applications 942 may include any of the built-in applications 940 as well as a broad assortment of other applications. In a specific example, the third-party application 942 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 942 may invoke the API calls 924 provided by the mobile operating system such as operating system 914 to facilitate functionality described herein.

The applications 920 may utilize built-in operating system functions (e.g., kernel 928, services 930, drivers 932, and/or ADCM module 960), libraries (e.g., system libraries 934, API libraries 936, and other libraries 938), and frameworks/middleware 918 to create user interfaces to interact with users of the system. Alternatively, or additionally, in some systems, interactions with a user may occur through a presentation layer, such as presentation layer 944. In these systems, the application/module "logic" can be separated from the aspects of the application/module that interact with a user.

Some software architectures utilize virtual machines. In the example of FIG. 9, this is illustrated by virtual machine 948. A virtual machine creates a software environment where applications/modules can execute as if they were executing on a hardware machine (such as the computing device 1000 of FIG. 10, for example). A virtual machine 948 is hosted by a host operating system (operating system 914 in FIG. 9) and typically, although not always, has a virtual machine monitor 946, which manages the operation of the virtual machine 948 as well as the interface with the host operating system (i.e., operating system 914). A software architecture 902 executes within the virtual machine 948 such as an operating system 950, libraries 952, frameworks/middleware 954, applications 956, and/or presentation layer 958. These layers of software architecture executing within the virtual machine 948 can be the same as corresponding layers previously described or may be different.

Figure 10:
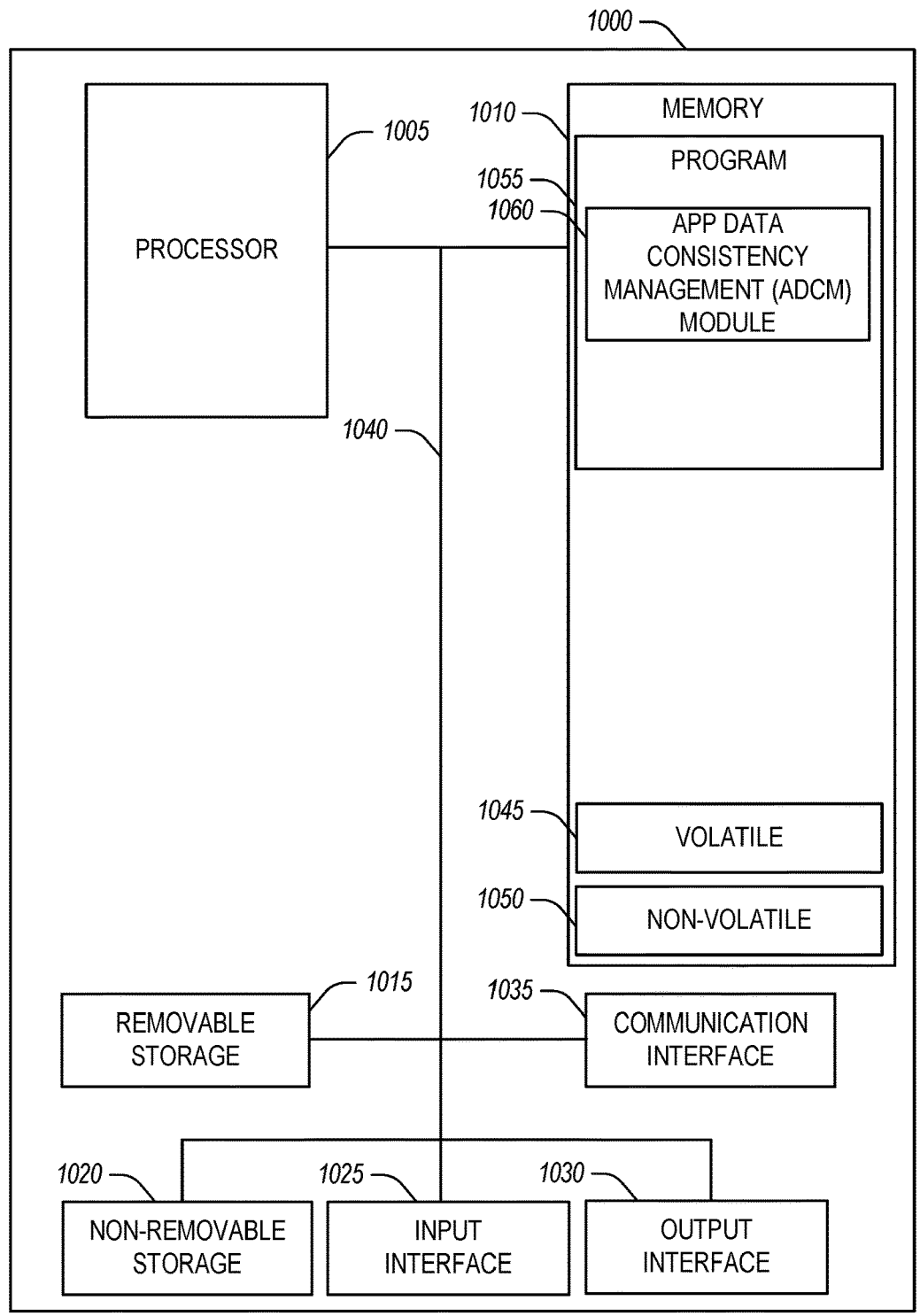
FIG. 10 is a block diagram illustrating circuitry for a device that implements algorithms and performs methods, according to some example embodiments.

FIG. 10 is a block diagram illustrating circuitry for a device that implements algorithms and performs methods, according to some example embodiments. All components need not be used in various embodiments. For example, clients, servers, and cloud-based network devices may each use a different set of components, or in the case of servers, larger storage devices.

One example computing device in the form of a computer 1000 (also referred to as computing device 1000, computer system 1000, or computer 1000) may include a processor 1005, memory 1010, a removable storage 1015, a non-removable storage 1020, an input interface 1025, an output interface 1030, and a communication interface 1035, all connected by a bus 1040. Although the example computing device is illustrated and described as the computing device 1000, the computing device may be in different forms in different embodiments.

The memory 1010 may include volatile memory 1045 and non-volatile memory 1050 and may store a program 1055. The computing device 1000 may include—or have access to a computing environment that includes—a variety of computer-readable media, such as the volatile memory 1045, the non-volatile memory 1050, the removable storage 1015, and the non-removable storage 1020. Computer storage includes random-access memory (RAM), read-only memory (ROM), erasable programmable read-only memory (EPROM) or electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

Computer-readable instructions stored on a computer-readable medium (e.g., the program 1055 stored in the memory 1010) are executable by the processor 1005 of the computing device 1000. A hard drive, CD-ROM, and RAM are some examples of articles including a non-transitory computer-readable medium such as a storage device. The terms "computer-readable medium" and "storage device" do not include carrier waves to the extent that carrier waves are deemed too transitory. "Computer-readable non-transitory media" includes all types of computer-readable media, including magnetic storage media, optical storage media, flash media, and solid-state storage media. It should be understood that software can be installed in and sold with a computer. Alternatively, the software can be obtained and loaded into the computer, including obtaining the software through a physical medium or distribution system, including, for example, from a server owned by the software creator or from a server not owned but used by the software creator. The software can be stored on a server for distribution over the Internet, for example. As used herein, the terms "computer-readable medium" and "machine-readable medium" are interchangeable.

The program 1055 may utilize one or more modules discussed herein, such as an ADCM module 1060. In some aspects, the ADCM module 1060 can be the same as (and perform the same functionalities as) any of the ADCM modules discussed in connection with FIGS. 1-8, such as the ADCM module 122 including the AVHT 124, the OTVHT 126, and DOTs 128, . . . , 130.

In an example embodiment, the computing device 1000 includes means for retrieving application data from a computing device of the plurality of computing devices, the application data including an application identification (ID) and a first application version number of an application executing on the computing device. The computing device 1000 further includes means for updating a first database table using object type information associated with the application ID and the first application version number, the object type information identifying a database table schema of a data object used by the application and a plurality of data fields of the data object. The computing device 1000 further includes means for synchronizing the data object using synchronization data for the plurality of data fields received from the second computing device to generate a synchronized data object. The computing device 1000 further includes means for receiving a second application version number from a second computing device, the second application version number associated with the application executing on the second computing device, in response to a notification of the synchronized data object communicated to the second computing device. The computing device 1000 further includes means for selecting one or more of the plurality of data fields of the synchronized data object, based on the second application version number, and means for communicating data stored by the one or more of the plurality of data fields to the third computing device for synchronization. In some embodiments, the computing device 1000 may include other or additional modules for performing any one or combination of steps described in the embodiments. Further, any of the additional or alternative embodiments or aspects of the method, as shown in any of the figures or recited in any of the claims, are also contemplated to include similar modules.

Any one or more of the modules described herein may be implemented using hardware (e.g., a processor of a machine, an application-specific integrated circuit (ASIC), field-programmable gate array (FPGA), or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

It should be further understood that software including one or more computer-executable instructions that facilitate processing and operations as described above concerning any one or all of the steps of the disclosure can be installed in and sold with one or more computing devices consistent with the disclosure. Alternatively, the software can be obtained and loaded into one or more computing devices, including obtaining the software through physical medium or distribution system, including, for example, from a server owned by the software creator or from a server not owned but used by the software creator. The software can be stored on a server for distribution over the Internet, for example.

Also, it will be understood by one skilled in the art that this disclosure is not limited in its application to the details of construction and the arrangement of components outlined in the description or illustrated in the drawings. The embodiments herein are capable of other embodiments and capable of being practiced or carried out in various ways. Also, it will be understood that the phraseology and terminology used herein is for description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. Also, the terms "connected" and "coupled" and variations thereof are not restricted to physical or mechanical connections or couplings. Further, terms such as up, down, bottom, and top are relative and are employed to aid illustration, but are not limiting.

The components of the illustrative devices, systems, and methods employed per the illustrated embodiments can be implemented, at least in part, in digital electronic circuitry, analog electronic circuitry, or computer hardware, firmware, software, or in combinations of them. These components can be implemented, for example, as a computer program product such as a computer program, program code or computer instructions tangibly embodied in an information carrier, or a machine-readable storage device, for execution by, or to control the operation of, data processing apparatus such as a programmable processor, a computer, or multiple computers.

A computer program can be written in any form of programming language, including compiled or interpreted languages, and it can be deployed in any form, including as a stand-alone program or as a module, component, subroutine, or another unit suitable for use in a computing environment. A computer program can be deployed to be executed on one computer or multiple computers at one site or distributed across multiple sites and interconnected by a communication network. Also, functional programs, codes, and code segments for accomplishing the techniques described herein can be easily construed as within the scope of the claims by programmers skilled in the art to which the techniques described herein pertain. Method steps associated with the illustrative embodiments can be performed by one or more programmable processors executing a computer program, code or instructions to perform functions (e.g., by operating on input data and/or generating an output). Method steps can also be performed by, and apparatus for performing the methods can be implemented as, special purpose logic circuitry, e.g., an FPGA (field-programmable gate array) or an ASIC (application-specific integrated circuit), for example.

The various illustrative logical blocks, modules, and circuits described in connection with the embodiments disclosed herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random-access memory or both. The required elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., electrically programmable read-only memory or ROM (EPROM), electrically erasable programmable ROM (EEPROM), flash memory devices, and data storage disks (e.g., magnetic disks, internal hard disks, removable disks, magneto-optical disks, CD-ROM disks or DVD-ROM disks). The processor and the memory can be supplemented by, or incorporated in, special purpose logic circuitry.

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

As used herein, "machine-readable medium" (or "computer-readable medium") means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store processor instructions. The term "machine-readable medium" shall also be taken to include any medium (or a combination of multiple media) that is capable of storing instructions for execution by one or more processors 1005, such that the instructions, when executed by one or more processors 1005, cause the one or more processors 1005 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" as used herein excludes signals per se.

Also, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the scope disclosed herein.

Although the present disclosure has been described regarding specific features and embodiments thereof, it is evident that various modifications and combinations can be made thereto without departing from the scope of the disclosure. For example, other components may be added to, or removed from, the described systems. The specification and drawings are, accordingly, to be regarded simply as an illustration of the disclosure as defined by the appended claims, and are contemplated to cover any modifications, variations, combinations or equivalents that fall within the scope of the present disclosure. Other aspects may be within the scope of the following claims.

What is claimed is:

1. A computer-implemented method for performing application data consistency management among a plurality of computing devices within a communication network, the method comprising:
retrieving, by a first computing device of the plurality of computing devices, application data from a second computing device of the plurality of computing devices, the application data including an application identification (ID) and a first application version number of an application residing on the second computing device;
updating, by the first computing device, a first database table using an object type associated with the application ID and the first application version number, the object type identifying a database table schema of a data object used by the application and a plurality of data fields of the data object, the first database table including an application version history table mapping the first application version number to the object type and to an object type version number; and
in response to communicating, by the first computing device, a notification of updated data fields of the plurality of data fields of the data object to a third computing device of the plurality of computing devices:
receiving, by the first computing device, a second application version number from the third computing device, the second application version number associated with the application residing on the third computing device;
selecting, by the first computing device, one or more data fields of the updated data fields, based on the second application version number; and
communicating, by the first computing device, data stored by the one or more data fields of the updated data fields to the third computing device for synchronization.

2. The computer-implemented method of claim 1, further comprising:
executing, by the first computing device, application code to install the application with the first application version number at the first computing device, prior to the updating of the first database table.

3. The computer-implemented method of claim 1, further comprising:
updating, by the first computing device, a second database table based on the object type, the second database table mapping the object type version number to the object type and to the plurality of data fields of the data object.

4. The computer-implemented method of claim 3, further comprising:
determining, by the first computing device, an object type version number used by the application residing on the third computing device, the determining using the first database table.

5. The computer-implemented method of claim 4, further comprising:
determining, by the first computing device, the one or more data fields of the updated data fields, the determining using the object type version number used by the application residing on the third computing device and using the second database table.

6. The computer-implemented method of claim 1, further comprising:
communicating, by the first computing device to the third computing device, the data stored by the one or more data fields of the updated data fields, the communicating being in response to a data download request from the third computing device, the data download request including the second application version number.

7. The computer-implemented method of claim 6, wherein the application data includes user information identifying a user authorized to use the application on the second computing device, and the method further comprising:
performing a verification, by the first computing device, whether the user is authorized to use the application on the third computing device;
communicating, by the first computing device to the third computing device, the data stored by the one or more data fields of the updated data fields, the communicating being when the verification is successful; and
generating, by the first computing device, a notification when the verification is unsuccessful.

8. A system for performing application data consistency management among a plurality of computing devices within a communication network, the system comprising:

a memory storing instructions; and
at least one processor in communication with the memory, the at least one processor configured, upon execution of the instructions, to perform the following steps:
retrieve application data from a second computing device of the plurality of computing devices, the application data including an application identification (ID) and a first application version number of an application residing on the second computing device;
update a first database table using an object type associated with the application ID and the first application version number, the object type identifying a database table schema of a data object used by the application and a plurality of data fields of the data object, the first database table including an application version history table mapping the first application version number to the object type and to an object type version number; and
in response to a communication of a notification of updated data fields of the plurality of data fields of the data object to a third computing device of the plurality of computing devices:
receive a second application version number from the third computing device, the second application version number associated with the application residing on the third computing device;
select one or more data fields of the updated data fields, based on the second application version number; and
communicate data stored by the one or more data fields of the updated data fields to the third computing device for synchronization.

9. The system of claim 8, wherein the at least one processor executes the instructions to:
update a second database table based on the object type, the second database table mapping the object type version number to the object type and to the plurality of data fields of the data object.

10. The system of claim 9, wherein the at least one processor executes the instructions to:
determine an object type version number used by the application residing on the third computing device, the determining using the first database table; and
determine the one or more data fields of the updated data fields, the determining using the object type version number used by the application residing on the third computing device and using the second database table.

11. The system of claim 10, wherein the at least one processor executes the instructions to:
communicate to the third computing device, the data stored by the one or more data fields, the communicating being in response to a data download request from the third computing device, the data download request including the second application version number.

12. A non-transitory computer-readable media storing computer instructions for performing application data consistency management among a plurality of computing devices within a communication network, that configure at least one processor, upon execution of the instructions, to perform the following steps:
retrieve application data from a second computing device of the plurality of computing devices, the application data including an application identification (ID) and a first application version number of an application residing on the second computing device;
update a first database table using an object type associated with the application ID and the first application version number, the object type identifying a database table schema of a data object used by the application and a plurality of data fields of the data object, the first database table including an application version history table mapping the first application version number to the object type and to an object type version number; and in response to a communication of a notification of updated data fields of the plurality of data fields of the data object to a third computing device of the plurality of computing devices:

receive a second application version number from the third computing device, the second application version number associated with the application residing on the third computing device;

select one or more data fields of the updated data fields, based on the second application version number; and communicate data stored by the one or more data fields of the updated data fields to the third computing device for synchronization.

13. The computer-readable media of claim 12, wherein the instructions further cause the at least one processor to:
update a second database table based on the object type, the second database table mapping the object type version number to the object type and to the plurality of data fields of the data object.

14. The computer-readable media of claim 13, wherein the instructions further cause the at least one processor to:
determine an object type version number used by the application residing on the third computing device, the determining using the first database table.

15. The computer-readable media of claim 14, wherein the instructions further cause the at least one processor to:
determine the one or more data fields of the updated data fields, the determining using the object type version number used by the application residing on the third computing device and using the second database table.

16. The computer-readable media of claim 15, wherein the instructions further cause the at least one processor to:
communicate to the third computing device, the data stored by the one or more data fields of the updated data fields, the communicating being in response to a data download request from the third computing device, the data download request including the second application version number.

17. The computer-readable media of claim 12, wherein the application data includes user information identifying a user authorized to use the application on the second computing device.

18. The computer-readable media of claim 17, wherein the instructions further cause the at least one processor to:
perform a verification whether the user is authorized to use the application on the third computing device;
communicate to the third computing device, the data stored by the one or more data fields of the updated data fields, the communication being when the verification is successful; and
generate a notification when the verification is unsuccessful.

* * * * *